(12) United States Patent
Hofmann

(10) Patent No.: US 9,350,821 B2
(45) Date of Patent: May 24, 2016

(54) END-TO END ACCELERATION OF DYNAMIC CONTENT

(71) Applicant: Limelight Networks, Inc., Tempe, AZ (US)

(72) Inventor: Jason Hofmann, New York, NY (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/467,814

(22) Filed: Aug. 25, 2014

(65) Prior Publication Data
US 2015/0180995 A1    Jun. 25, 2015

Related U.S. Application Data

(63) Continuation of application No. 14/066,415, filed on Oct. 29, 2013, now Pat. No. 8,819,187.

(51) Int. Cl.
*G06F 15/16* (2006.01)
*H04L 29/08* (2006.01)
*H04L 29/06* (2006.01)
*H04L 29/12* (2006.01)

(52) U.S. Cl.
CPC ........ *H04L 67/2842* (2013.01); *H04L 61/2007* (2013.01); *H04L 65/4084* (2013.01); *H04L 65/80* (2013.01); *H04L 67/2814* (2013.01); *H04L 69/14* (2013.01); *H04L 61/6068* (2013.01)

(58) Field of Classification Search
USPC .......................................... 709/217, 218, 219
See application file for complete search history.

(56) References Cited

U.S. PATENT DOCUMENTS

| 7,778,165 | B2 * | 8/2010 | Madhyastha et al. | 370/229 |
| 7,961,625 | B2 * | 6/2011 | Raciborski et al. | 370/237 |
| 8,621,042 | B2 * | 12/2013 | Eggleston et al. | 709/218 |
| 2003/0135509 | A1 * | 7/2003 | Davis et al. | 707/100 |
| 2009/0122697 | A1 * | 5/2009 | Madhyasha et al. | 370/229 |
| 2013/0322847 | A1 * | 12/2013 | Anderson et al. | 386/240 |
| 2013/0326022 | A1 * | 12/2013 | Ehrlich et al. | 709/219 |

* cited by examiner

*Primary Examiner* — Liangche A Wang
(74) *Attorney, Agent, or Firm* — Kilpatrick Townsend & Stockton LLP

(57) ABSTRACT

A method of accelerating dynamic content between Points of Presence (POPs) and front-loading latency bottlenecks in a Content Delivery Network (CDN) may include receiving, at a first POP, a content request from a user device, where content responsive to the content request includes a first content portion that is not stored in the first POP. The method may also include determining that the first content portion is available through a second POP. The method may additionally include transmitting the first content portion through a persistent connection mesh from the second POP to the first POP, wherein the persistent connection mesh is maintained between the first POP and the second POP prior to the request for content being received by the first POP. The method may further include delivering the content responsive to the content request to the user device.

20 Claims, 13 Drawing Sheets

END-TO END ACCELERATION OF DYNAMIC CONTENT

CROSS-REFERENCES TO RELATED APPLICATIONS

This application is a Continuation of U.S. application Ser. No. 14/066,415, filed Oct. 29, 2013, and entitled "END-TO-END ACCELERATION DYNAMIC CONTENT", which is fully incorporated by reference herein.

BACKGROUND

A content delivery network (CDN) is a large distributed system of servers deployed in multiple data centers throughout the Internet. The goal of a CDN is to serve content to end-users with high availability and high performance. Besides better performance and availability, CDNs also offload the traffic served directly from the content provider's origin infrastructure. CDNs can include geographically distributed points of presence (POPs) to locate edge servers close to end users. CDNs are capable of delivering content in high demand with higher quality of service (QoS). Content can be requested from a CDN using a universal resource locator (URL). Various techniques are used to route a URL request to a nearby POP, for example, in order to efficiently retrieve content.

BRIEF SUMMARY

In some embodiments, a system for accelerating dynamic content between Points of Presence (POPs) and front-loading latency bottlenecks in a Content Delivery Network (CDN) may be presented. The system may include a first POP in the CDN configured to receive a content request from a user device. The first POP may include a first plurality of edge servers that store and distribute content in response to user requests, and content responsive to the content request may include a first content portion that is not stored in the first POP. The system may also include a second POP in the CDN configured to receive a content request from a user device. The second POP may include a second plurality of edge servers that store and distribute content in response to user requests. The first content portion may be available through the second POP. The system may additionally include a persistent connection mesh between the first POP and the second POP. The persistent connection mesh may be maintained between the first POP and the second POP prior to the request for content being received by the first POP, and the first content portion may be transmitted through the persistent connection mesh from the second POP to the first POP.

In some embodiments, a method of accelerating dynamic content between Points of Presence (POPs) and front-loading latency bottlenecks in a Content Delivery Network (CDN) may be presented. The method may include receiving, at a first POP, a content request from a user device. The first POP may include a first plurality of edge servers that store and distribute content in response to user requests. Content responsive to the content request may include a first content portion that is not stored in the first POP. The method may also include determining that the first content portion is available through a second POP. The second POP may include a second plurality of edge servers that store and distribute content in response to user requests. The method may additionally include transmitting the first content portion through a persistent connection mesh from the second POP to the first POP. The persistent connection mesh may be maintained between the first POP and the second POP prior to the request for content being received by the first POP. The method may further include delivering the content responsive to the content request to the user device.

BRIEF DESCRIPTION OF THE DRAWINGS

The subject matter that is regarded as the invention is particularly pointed out and distinctly claimed in the claims at the conclusion of the specification. The foregoing and other objects, features, and advantages will be apparent from the following detailed description taken in conjunction with the accompanying drawings.

DETAILED DESCRIPTION

The ensuing description provides descriptions of exemplary embodiments only, and is not intended to limit the scope, applicability, or configuration of the disclosure. Rather, the ensuing description of the exemplary embodiments will provide those skilled in the art with an enabling description for implementing the embodiments of the claims. It will be understood that various changes may be made in the function and arrangement of elements without departing from the spirit and scope as set forth in the appended claims.

Figure 1:
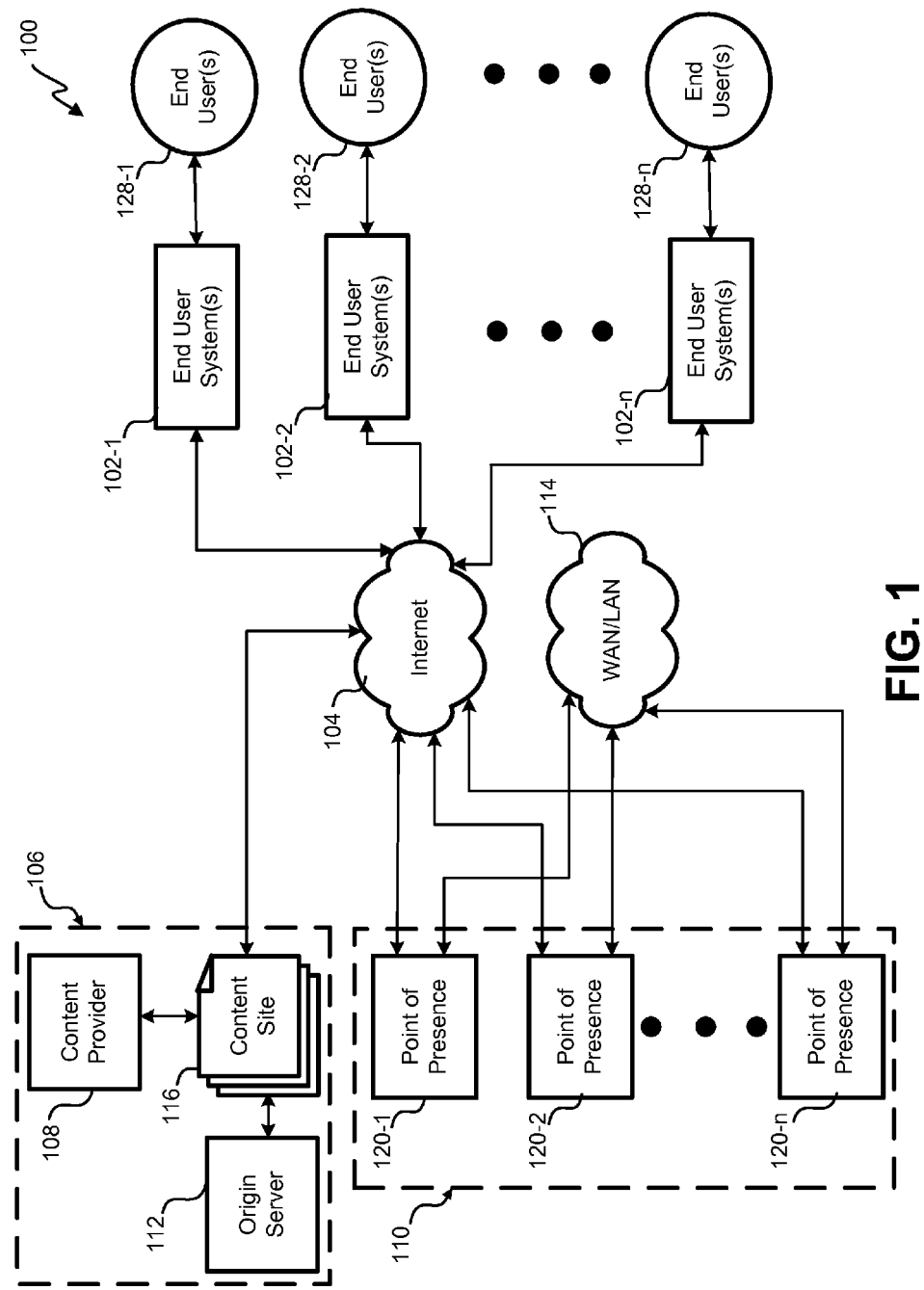
FIG. 1 illustrates a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and may include a content provider 108, a content site 116, and/or an origin server 112. The CDN 110 can both cache and/or host content in various embodiments for third parties, such as the content originator 106, to offload delivery and typically provide better quality of service (QoS) to a broad spectrum of end-user systems 102 distributed worldwide.

In this embodiment, the content distribution system 100 locates the content objects (or portions thereof) and distributes the content objects to one or more end-user systems 102. The content objects can be dynamically cached and/or hosted within the CDN 110. A content object may include any content file or content stream and could include, for example, video, pictures, data, audio, software, analytics, and/or text. The content object could be live, delayed, or stored. Throughout the specification, references may be made to a content object, content, content stream and/or content file, but it is to be understood that those terms could be used interchangeably wherever they may appear.

Many content providers 108 may use a CDN 110 or even multiple CDNs 110 to deliver the content objects over the Internet 104 to end users 128. The CDN 110 may include a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102 in a network sense. Routing requests between the multiple POPs can be done during the DNS resolution and refined by assignment of an edge server. Other embodiments use routing, redirection, Anycast, DNS assignment and/or other techniques to locate the particular edge server that are able to provide content to the end users 128. In addition to the Internet 104, a wide area network (WAN), and/or a local area network (LAN) 114 or other backbone may couple the POPs 120 with each other and with other parts of the CDN 110.

When an end user 128 requests content, such as a web page, through its respective end-user system 102 while browsing, the request for the web page can be passed either directly or indirectly via the Internet 104 to the content originator 106. The content originator 106 may be defined as the source or re-distributor of content objects. The content site 116 may include an Internet web site accessible by the end-user system 102. For example, the content site 116 could be a web site where the content is viewable using a web browser. In other embodiments, the content site 116 could be accessible with application software or customized hardware other than a web browser, for example, a set top box, a content player, video streaming appliance, a podcast player, an app running on a smart phone, etc. The content provider 108 can redirect such content requests to the CDN 110 after they are made, or alternatively can formulate the delivery path by embedding the delivery path into the universal resource indicators (URIs) for a web page. In either case, the request for content can be handed over to the CDN 110 in this embodiment by having the end-user system 102 perform a DNS look-up so as to choose which of the multiple POPs 120 should provide the requested content.

In the case of static content, a particular edge server may retrieve the portion of the content object from the content provider 108. Alternatively, the content provider 108 may directly provide the content object to the CDN 110 and its associated POPs 120 through prepopulation, i.e., in advance of the first request. The servers of the CDN 110 may include edge servers in each POP 120 that are configured to serve end user requests and/or store the actual content. The origin server 112 may continue to store a copy of each content object for the content originator 106. Periodically, the content of the origin server 112 may be reconciled with the CDN 110 through a cache, hosting, and/or pre-population algorithms. Some content providers could use an origin server within the CDN 110 to host the content and thus avoid the need to maintain a separate copy.

Once the content object is retrieved from the origin server 112, the content object may be stored within the particular POP 120 and may be served from that POP 120 to the end-user system 102. The end-user system 102 may receive the content object and processes it for use by the end user 128. The end-user system 102 could be a personal computer, media player, tablet computer, handheld computer, Internet appliance, phone, IPTV set top, video stream player, streaming radio, PDA, smart phone, digital music player, or any other device that can be configured to receive and process content objects. In some embodiments, a number of the end-user systems 102 could be networked together. Although this embodiment only shows a single content originator 106 and a single CDN 110, it will be understood that there could be many of each in various embodiments. Additionally, in some embodiments a content originator 106 could have a "captive" CDN 110 that is optionally used for its content when a third-party CDN is used to shed requests.

Figure 2A:
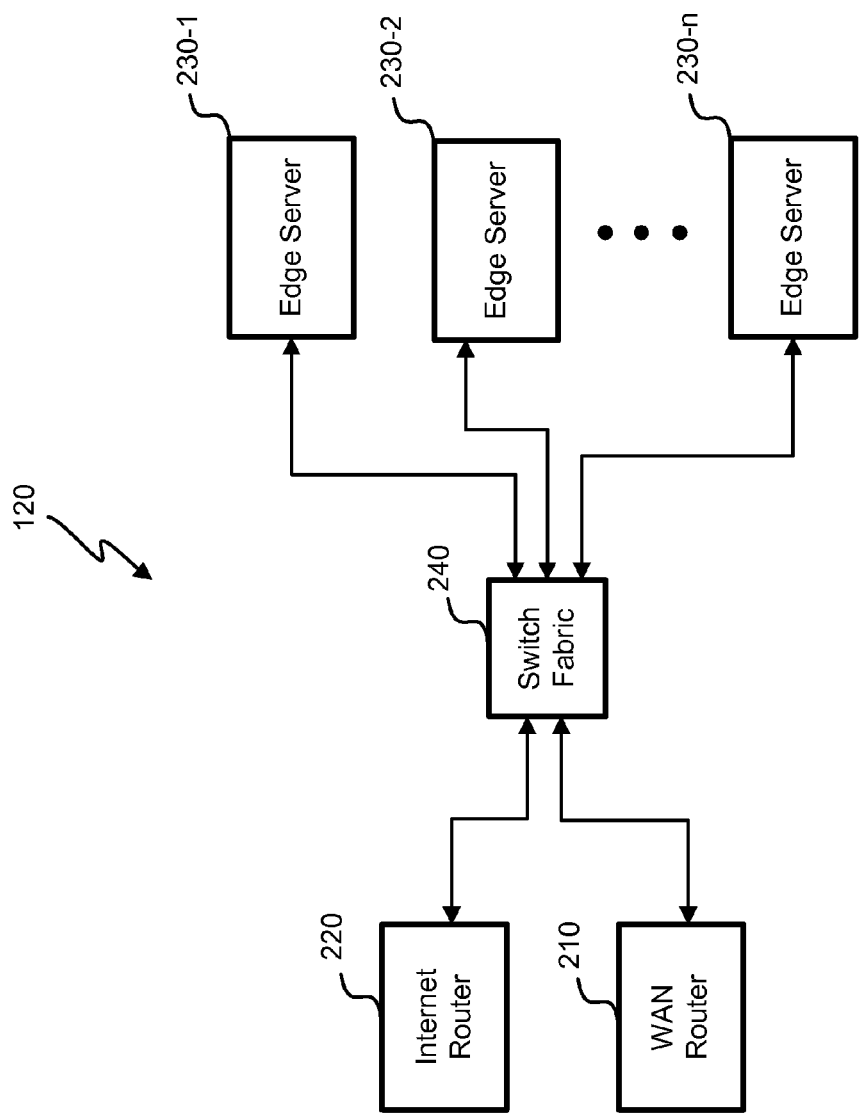
FIG. 2A illustrates a block diagram of an embodiment of a Point of Presence (POP) that is part of a content delivery network (CDN).

With reference to FIG. 2A, a block diagram of an embodiment of a POP 120 is shown that is part of the CDN 110. Although only one POP 120 is depicted, there may be a number of POPs 120 similarly configured and geographically distributed throughout the CDN 110. The POPs 120 can communicate through a WAN router 210 and/or an Internet router 220 for locating content objects. An interface to the Internet 104 from the POP 120 accepts requests for content objects from end-user systems 102. The request comes from an Internet protocol (IP) address in the form of a URI.

Edge servers 230 may be implemented using general-purpose computers loaded with software to perform various functions for the CDN 110. The edge servers 230 could be rack mounted or arranged in clusters. Multiple hardware processors and storage media could be used to implement each edge server 230. Each edge server 230 can load multiple instances of the same software and/or a variety of software to implement various functionalities. For example, software may be used on edge servers to implement switching fabric, routing, caching, hosting, DNS lookup, analytics, business rules, delivery assignment, and/or the like. The software instances can scale with the size of each POP 120. Different edge servers 230 may have a different set of functionality as defined by the software instances that are programmed to run on each edge server 230.

Switch fabric 240 assigns the request to one of the edge servers 230 according to a routing scheme such as round robin, load balancing, Cache Array Routing Protocol (CARP), random, and/or the like. In this embodiment, the switch fabric may be aware of which edge servers 230 have particular capabilities and may assign requests within the group having the particular capability to store and serve the particular content object referenced in a requested URI. A protocol such as CARP may be used in this embodiment to dispense the URIs between the edge servers 230. Every time that a particular URI is requested from the group, it may be assigned to the same edge server 230. For purposes of assigning a request, edge servers may be grouped together based on their ability to provide a requested content object, service a particular type of request, and/or the like.

In another embodiment, the switch fabric 240 assigns the request to one of the edge servers 230, which can either service the request or reassign it to a neighboring edge server 230 with software to perform an assignment master function. The switch fabric 240 sends each packet flow or request to an edge server 230 listed in the configuration of the switch fabric 240. The assignment can be performed by choosing the edge server 230 with the least amount of connections or the fastest response time. In some embodiments, the switch fabric 240 may assign the packet flow somewhat arbitrarily using round robin or random methodologies. When the chosen edge server 230 receives the packet flow, an algorithm may be used by the chosen edge server 230 to potentially reassign the packet flow between a group of edge servers to the one dictated by the algorithm. For example, the switch fabric 240 could choose a second edge server 230-2 being the next in the round robin rotation. The second edge server 230-2 could process the request and find that the first edge server 230-1 is being assigned this type of request. The request could then be reassigned to the first edge server 230-1 to fulfill.

As described above for static content, the CDN 110 may be used to host content for others. Content providers 108 may upload content to an edge server 230 that hosts the content and functions as an origin server. After the content provider 108 places a content object in the CDN 110 it need not be hosted on the origin server 112 redundantly. Edge servers 230 can perform the hosting function within the CDN 110 with other edge servers 230 perhaps caching the same content that is hosted by another edge server 230.

Requests from end-user systems 102 are assigned to an edge server 230 that may cache the requested content object. On occasion, the edge server 230 receiving a request does not have the content object stored and available for immediate serving. This so-called "cache miss" triggers a process within the CDN 110 to effectively find the content object (or portion thereof) while providing adequate Quality of Service (QoS). It should be noted that dynamic, generated, or personalized content is generally considered non-cacheable, and would therefore result in a cache miss. The content, or portions of the content, may be found in neighboring edge servers 230 in the same POP 120, in another POP 120, or even an external origin server 112. The various edge servers 230 may be grouped for various URIs uniquely. In other words, one URI may look to one group of edge servers 230 on a cache miss while another URI will look to a different group of edge servers 230. In various embodiments, a particular URI could be assigned to one or more edge servers 230 in a single POP, multiple POPs or even in every POP. Generally, more popular content is stored on more edge servers 230 and more POPs 120.

When servicing requests from end-user systems 102, some form of content processing may be performed on the requested content before it is delivered from an edge server 230. In some cases, content processing may be performed by special software/hardware modules that are integrated with existing devices within the POP 120 or on the origin server itself 112. If the content processing is performed on an edge server 230 or on an origin server 112, the software/hardware performing the content processing may need to be distributed to each edge server 230 and/or each origin server 112.

Figure 2B:
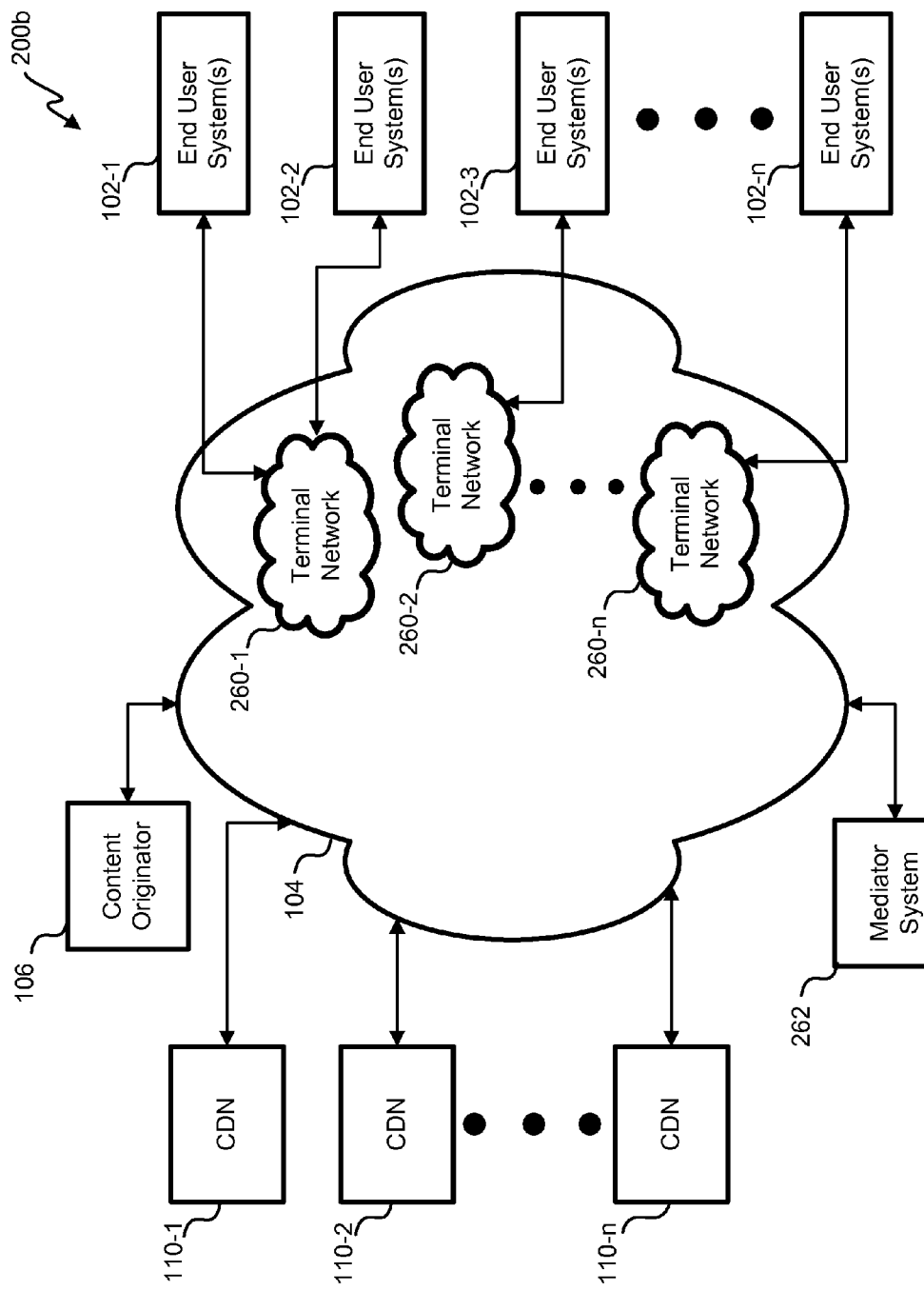
FIG. 2B illustrates a shared delivery system, according to some embodiments.

Referring next to FIG. 2B, an embodiment of a shared delivery system 200b is shown. In this embodiment, a content originator 106 is connected to the Internet 104. Also connected to the Internet 104 are a plurality of CDNs 110 and a plurality of end-user systems 102. As part of the Internet 104, a plurality of terminal networks 260 provide Internet service to the plurality of end-user systems 102. Some examples of terminal networks include CenturyLink, Comcast, Verizon, AT&T, etc. In some embodiments, terminal networks 260 are "last mile" networks providing telecommunications, cable television, and/or internet services to end users 128. In other embodiments, terminal networks 260 include peer networks and tier 1 networks. Many terminal networks 260 have caches to store content objects. The caches of the terminal networks 260 can be a single cache or spread out among a plurality of caches similar to a CDN 110 with a plurality of POPs 120. Some terminal networks 260 may function as a content delivery network.

In this embodiment, the content originator 106 contracts with a first CDN 110-1 for delivery of a content object to end-user systems 102. Though only one content originator 106 is shown, there may be many content originators 106 contracting with CDNs and/or terminal networks 260 for delivery of a plurality of content objects. The first CDN 110-1 subcontracts delivery of the content object to a second CDN 110-2 and/or terminal networks 260 for delivery to end-user systems 102. In some embodiments, the first CDN 110-1 subcontracts delivery of the content object to the second CDN 110-2 because the second CDN 110-2 has a better coverage of POPs 120 in a given geographic area. For example, the first CDN 110-1 may have several POPs 120 in North America and Europe, but not South America. The second CDN 110-2 may have several POPs 120 in South America. To deliver the content object to an end user in South America, the first CDN 110-1 subcontracts delivery of the content object to the second CDN 110-2. In another example, the second CDN 110-2 also has POPs 120 in Europe. When POPs 120 of the first CDN 110-1 in Europe become overloaded, the first CDN 110-1 has the second CDN 110-2 deliver the content object in Europe.

The first CDN 110-1 may also subcontract delivery of the content object with terminal networks 260. In some embodiments, the terminal network 260-1 caches the content object when delivering the content object to a first end-user system 102-1. When a second end-user system 102-2 requests the content object, the terminal network 102-1 serves the content object from the cache of the terminal network 260.

In some embodiments, a mediator system 262 is also connected to the Internet 104. The mediator system 262 serves several functions for the shared delivery system 300, such as assignment, accounting, and control. The mediator system 262 receives requests for delivery of the content object and assigns a CDN 110 or a terminal network 260 to deliver the content object. The mediator system 262 chooses a CDN 110 or terminal network 260 based on geography, network latency, delivery cost, quality of service, etc. In some embodiments the mediator system 262 contracts with the content originator 106 for delivery of the content object instead of the first CDN 110-1 contracting with the content originator 106 for delivery of the content object. In other embodiments, the mediator system 262 is part of, and/or controlled by, a CDN 110 or terminal network 260. Also, there could be two or more mediator systems 262, and each of the mediator systems 262 may be tied to a particular CDN 110.

In some embodiments, the mediator system 262 accounts for content delivery. After assigning delivery of the content object to a CDN 110 or terminal network 260, the mediator system 262 credits that network with delivery of the content object. In other embodiments, the mediator system 262 receives reports about delivery of the content object before crediting the CDN 110 or terminal network 260 for delivery.

In some embodiments, the mediator system 262 also establishes control parameters for delivery of the content object. For example, the content originator 106 may set a minimum quality of service threshold for delivering the content object. When assigning delivery of the content object, the mediator system 262 passes variables specifying the control parameters to the CDN 110 and/or terminal network 260 delivering the content object. The mediator system 262 also sends instructions outside the content object request cycle. For example, the mediator system 262 receives instructions from the content originator 106 to purge the content object from caches within the shared delivery system 300. The mediator system 262 then sends a notification out of band for the CDN 110 and/or terminal network 260 to purge the content object from a cache of the CDN 110 and/or terminal network 260.

There are generally two classifications that determine how content can be delivered. First, there is static content. Static content can be provided from a customer data center to a delivery network. Because of the static nature of the content, it can be cached throughout a delivery network such that user requests can be serviced quickly from geographic locations that are close to the user. Optimizing the delivery of static content generally involves optimizing the performance, location, size, and/or configuration of caches in various locations throughout the delivery network. Generally, the delivery of static content depends on a latency distance from the user to the servicing cache of the delivery network.

The second classification involves dynamic content. Dynamic content can be provided from a customer origin environment to a delivery network, however it generally cannot be cached because the dynamic content changes periodically, or may be personalized for each requestor. Dynamic content may involve bank account balances, most popular videos, current news stories, and/or any other type of content that will not generally remain static over time. Therefore, users accessing dynamic content generally cannot simply request the content from a local point of presence (POP) in the delivery network. Instead, users have to connect with a customer data center that may be geographically remote from the user. As used herein, the term "origin," "customer origin environment," "origin environment," or "origin server" may be used to refer to a customer data center, a customer server, or any other customer system that provides content to the delivery network for delivery to requesting users.

Figure 3:
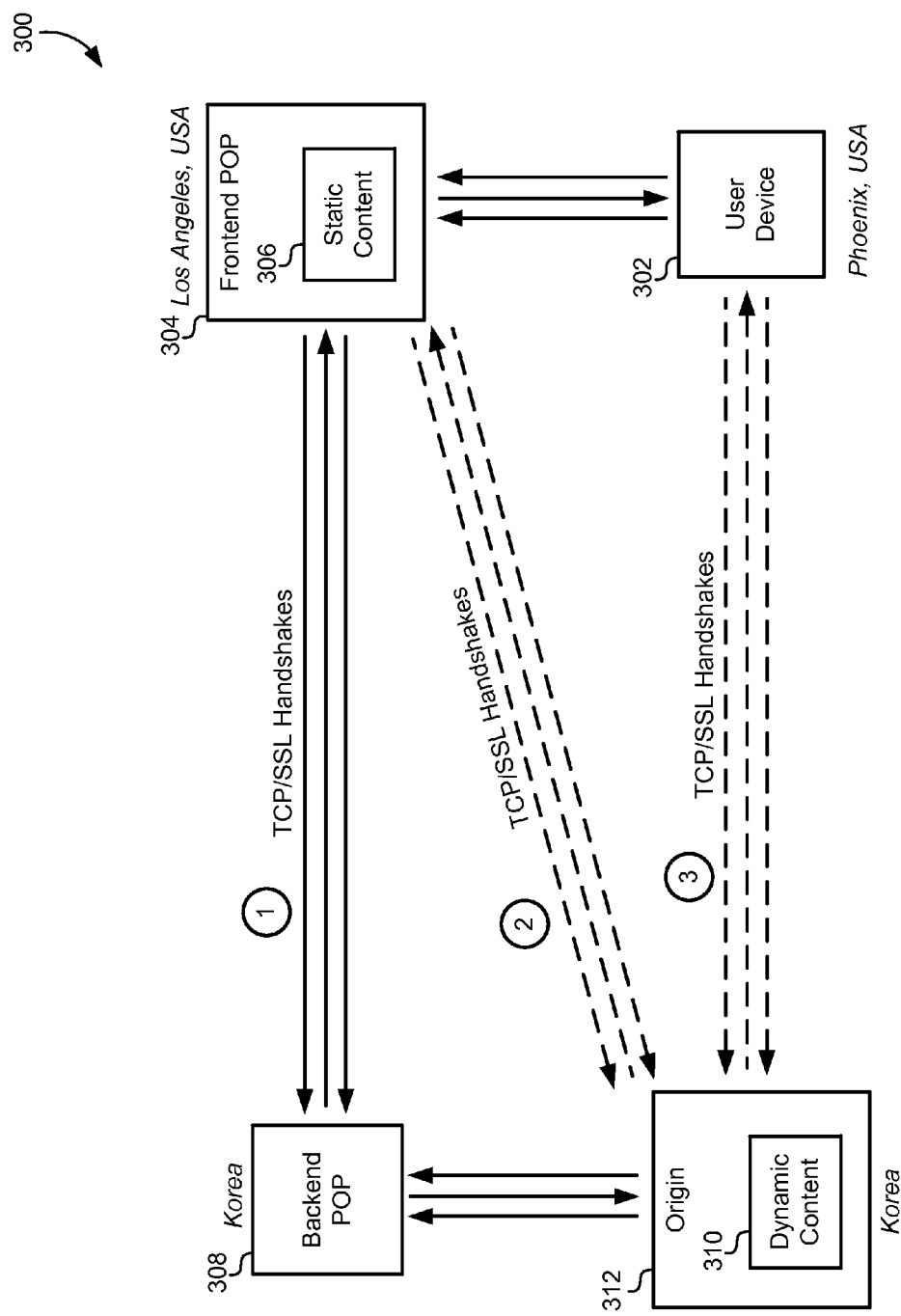
FIG. 3 illustrates a block diagram of a content delivery network serving both local and distant users, according to some embodiments.

FIG. 3 illustrates a block diagram 300 of a content delivery network serving both local and distant users. For example, a user device 302 in Phoenix requesting a webpage that includes both static content 306 and dynamic content 310 from an a customer with an origin server 312 in Korea could retrieve a cached version of the static content 306 from a local point of presence 304 in Los Angeles. However, the dynamic content 310 would have to be retrieved from the customer's origin server 312 in Korea. This situation results in what is known as a long-haul communication bottleneck between a local point of presence 304 and either a remote point of presence 308 or the origin 312.

The long-haul communication involves a transmission control protocol (TCP) three-way handshake. Before a user device 302 can connect with a server, the user device 302 generally sends a SYN to the server to request an active opening of the server port. Next, the server will respond with a SYN-ACK response that acknowledges the SYN request. Finally, the user device 302 may reply with an ACK back to the server. Each of these operations might involve data packets that uniquely identify this particular transaction. Consequently, one and a half round trips between the user device 302 and the server are required before the server can begin delivering data to the user. The first response, or "initial congestion window," may include as few as one frame (1400 bytes) to as many as 12 to 18 frames. Note that there is no technical limit to frame size, but very large frame sizes can result in performance degradation. In this example, the server may include an edge server in the local point of presence 304, an edge server in the remote point of presence 308, or the origin server 312.

For static content, the TCP three-way handshake still takes place, but only over short distances. For example, the user device 302 may only be 5 ms in latency away from the local point of presence 304. Therefore, the TCP three-way handshake would only require 15 ms, after which the static content 306 could be delivered to the user device 302. In contrast, if the origin server 312 is 150 ms away from the user device 302, a total of 450 ms is required to initially establish communications between the origin server 312 and the user device 302 before the first response of requested content can actually be transmitted. In most cases, the actual delay will typically be worse than a direct connection between the user device 202 and the origin server 312. The TCP three-way handshake may be required between user device 302 and the local point of presence 304, between the local point of presence 304 and the remote point of presence 308, and/or between the remote point of presence 308 and the origin server 312. Generally, the longest latency will be between the local point of presence 304 and the remote point of presence 308, or between the local point of presence 304 and the origin 312, depending on how the connections are made.

Adding to this latency is a congestion control strategy used by TCP known as a slow start. Slow start is used in conjunction with other algorithms to avoid sending more data than the delivery network is capable of transmitting to avoid unnecessary network congestion. After a connection is established by the TCP three-way handshake, slow start works by limiting the initial congestion window and increasing the size of the congestion window over time. Therefore, not only is a long latency (e.g. 450 ms) required to establish an initial connection between a remote point of presence 308 and a local point of presence 304, but once that connection is established TCP will generally throttle the transmission rate between these points of presence until the connection has remained established over a sufficient time interval. Over short latencies, the slow start protocol can usually quickly negotiate connection speed that results in a very high throughput. However, for long-haul connections will slow start protocol may never reach a state of high throughput. The higher latency may delay packet acknowledgment and generally limit the bandwidth of the connection according to the rules of TCP. For example, a connection between the user device 302 and the local point of presence 304 may eventually negotiate a very high throughput, while the connection between the local point of presence 304 and the remote point of presence 308 may remain throughput-limited indefinitely.

Additionally, secure content may also require a Secure Sockets Layer (SSL) handshake that involves a combination of encrypted key exchanges that further delay the delivery of the requested content to the user device 302. Therefore, long-haul communications are hampered by a combination of the TCP three-way handshake latency, the TCP slow-start bandwidth throttling, and (when necessary) a multistep SSL handshake. In some cases, over 1 second of delay may result before even the first byte of data can be delivered to the user device 302. One of the primary purposes of a delivery network is to eliminate these long-haul communications that involve so much overhead and instead deliver content primarily over short distances. However, with dynamic content that cannot reliably be cached in a content delivery network edge server, long-haul communications of dynamic content have previously been unavoidable.

Some of the embodiments described herein may be implemented such that the long-haul bottlenecks described above can be largely eliminated for dynamic content delivery over long distances. The user device 302 may connect to a local point of presence 304 to request dynamic content 310. The delivery network can maintain open connections between servers within each of the points of presence 304, 308 in the delivery network. Because these connections are maintained and already open, the TCP three-way handshake need not be repeated for each request. Also, these inter-POP connections may be "pre-warmed" such that the throughput between these connections is already maximized. Because these connections are maintained open, and because they have previously sent and received data, the throughput need not operate in a pessimistic state that would normally characterize a new long-distance connection. Because the connection has been open for an extended period of time and proven to be reliable, a large amount of data can be sent through the connection without requiring as many acknowledgments. Therefore, the delay waiting for the TCP three-way handshake and SSL handshakes can be eliminated, as well as the throughput bottlenecking imposed by the slow start mechanism. In essence, all of these bottlenecks can be frontloaded such that subsequent communications between points of presence can be much faster.

Figure 4:
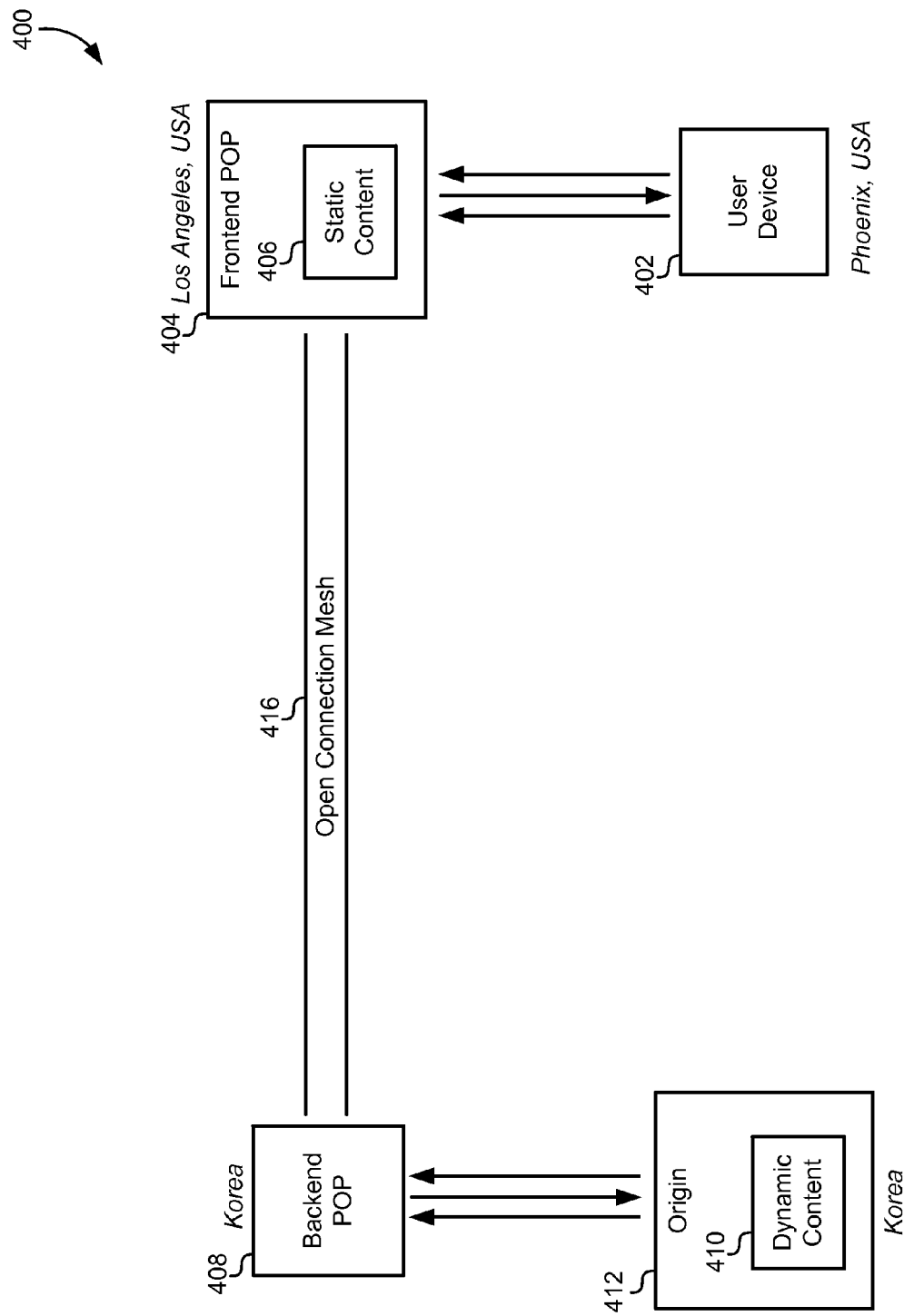
FIG. 4 illustrates a block diagram of a content delivery network that includes open connections between POPs, according to some embodiments.

FIG. 4 illustrates a block diagram 400 of a content delivery network that includes open connections between POPs, according to some embodiments. Block diagram 400 is similar to block diagram 300, except that a "pre-warmed" inter-POP connection 416 between POPs has previously been established and maintained to handle long-haul communication traffic. In some embodiments, the inter-POP connection 416 may comprise a number of connections between a minimum and maximum. For example, some embodiments may use a minimum of eight connections and a maximum of 14 connections, depending upon a measured amount of content traffic. In some embodiments, the inter-POP connection 416 may link a single server between the Los Angeles POP 404 and the Korea POP 408. In other embodiments, the inter-POP connection 416 may represent connections between a plurality of servers in the Los Angeles POP 404 and the Korea POP 308. In other words, each connection in the inter-POP connection 416 may be established between different individual servers within each POP 404, 408.

Although not shown explicitly in FIG. 4, a content delivery network will generally have multiple POPs that are geographically distributed throughout the world. Therefore, the inter-POP connection 416 may be duplicated between any and all POPs that are part of the content delivery network. Therefore, the Los Angeles POP 404 may have additional inter-POP connections that are coupled to other POPs in different cities. The plurality of inter-POP connections that exist within the content delivery network may form a connection mesh that is not on-demand but, instead always open without requiring a specific content request. Some embodiments may open the inter-POP connections as soon as the servers are initialized. Therefore, these inter-POP connections will be available for content delivery at any time during the lifetime of the content delivery network.

Generally, if request is not made through one of the inter-POP connections 416 for a certain time interval, that inter-POP connection may become stale, slow, and/or unreliable. Therefore, some embodiments may detect when one of the inter-POP connections is no longer performing optimally. These inter-POP connections can then be shut down and immediately restarted to refresh the quality of the inter-POP connection. In some embodiments, a time interval may be measured between transmissions through any particular inter-POP connection. After a predefined time interval without traffic, or a predefined interval since the connection was first opened, it may be assumed that the connection has become stale, at which point the content delivery network can close, and reopen (or simply refresh) that particular inter-POP connection. These embodiments may create a connection mesh between POPs that are always open and reliable.

By way of example, if content is requested from the user device 402 in Phoenix, a connection will be opened with the Los Angeles POP 404. Because of the close proximity, this may take, for example, an average 12 ms. The connection between the Los Angeles POP 404 and the Korean POP 408 will also be subject to all of the long-haul communication bottlenecks described above. After this connection is established, content transfers may take an average of 170 ms to complete. The final leg is between the origin server 412 and the Korean POP 408. This leg may be completed in 0.2 ms.

Using test data comprised of a content object of 100 kB (6 kB compressed) stored in an uncompressed form on the origin 412 in Korea, content could be requested from the user device 402 and traced along a number of different delivery paths. In one instance, the user device 402 in Phoenix connected directly with the origin 412 in Korea, and the content object was delivered in an average of 2.3 seconds. This direct connection was subject to all of the long-haul communication bottlenecks or described above. The connection established between the origin 412 and the user device 402 required the TCP handshakes and was subject to the TCP slow start throttling.

Instead of establishing a direct connection between the user device 402 and the origin 412, a traditional CDN model would connect the origin 402 to the Los Angeles POP 404, and the Los Angeles POP 404 would connect to the origin 412. Again, this traditional CDN method was subject to the long-haul communication bottlenecks described above, and resulted in an average content delivery time of 1.8 seconds.

Finally, as implemented by one or more of the embodiments described herein, a previously established, inter-POP connection 416 was used. In this case, the user device 402 connected with the Los Angeles POP 404, Los Angeles POP 404 connected with the Korean POP 408 through the inter-POP connection 416, and the Korean POP 408 connected with the origin server 412. Despite these extra connections, the inter-POP connection 416 was able to eliminate the long-haul communication bottlenecks. The resulting content transfer required only an average of 200 ms. As illustrated by these exemplary numbers, the inter-POP connection 416 that is previously established and pre-warmed can increase the speed of content delivery by on average a factor of 10.

While the advantages of maintaining a persistent inter-POP connection 416 are clear in light of the numbers disclosed above, this configuration is not easily implemented. FIG. 4 shows only the simple case of one set of inter-POP connections between just two POPs. However, in a real CDN, the tens or hundreds of POPs may exist in maintaining connections between each server in each POP would grow exponentially and very quickly become unmanageable. Generally, each POP may have between 50 and 100 edge servers. This would result in a combinatorial explosion of connections that would need to be maintained at any given time. State tables that maintain each connection would quickly be overrun with the hundreds of millions of connections that would be needed.

Figure 5:
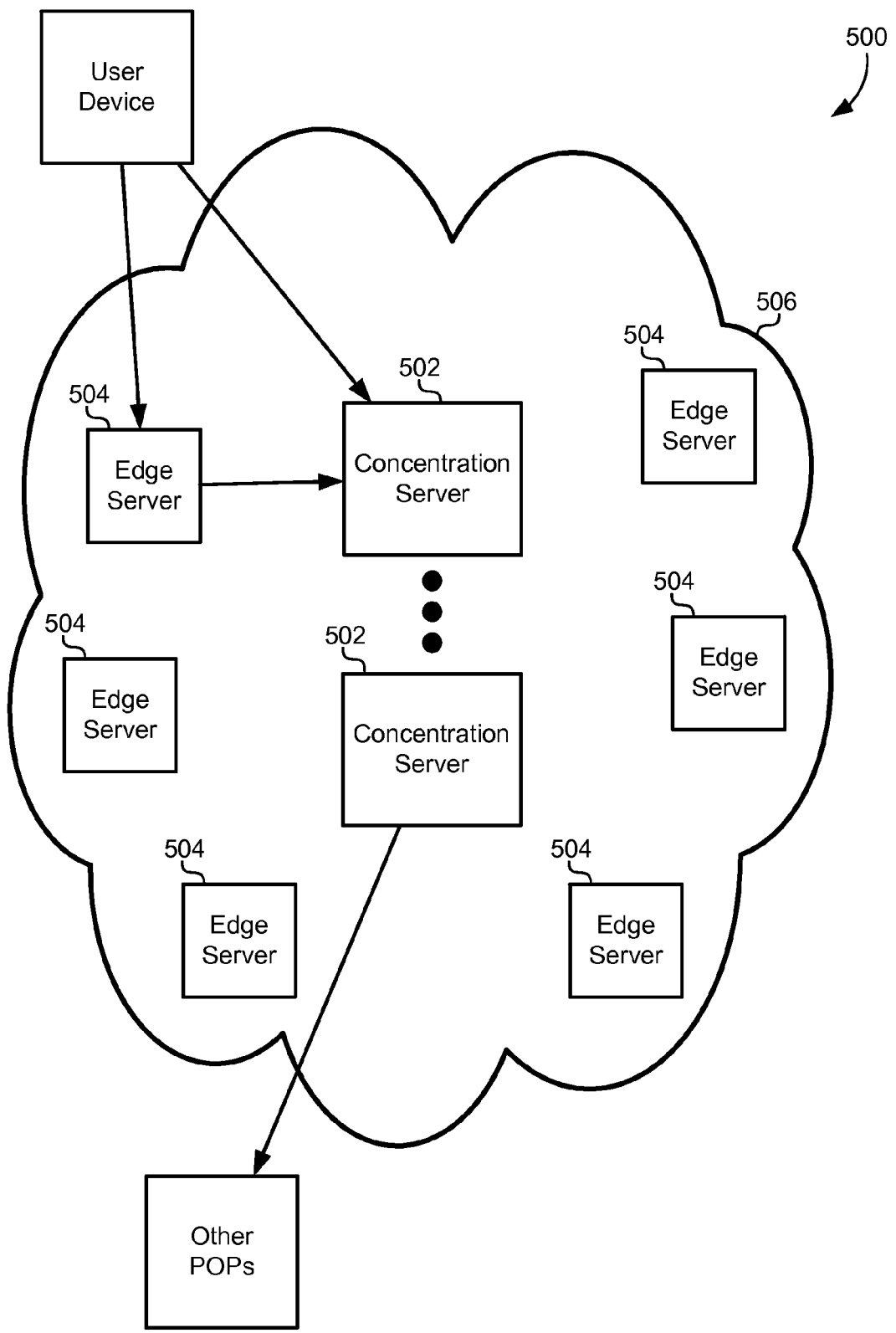
FIG. 5 illustrates a block diagram with one or more concentration servers configured to handle persistent inter-POP connections, according to some embodiments.

FIG. 5 illustrates a block diagram 500 with one or more concentration servers 502 configured to handle persistent inter-POP connections, according to some embodiments. A concentration server may perform the opposite function of a traditional multiplexer. The basic concept of the concentration server 502 is to take many requests originating from edge servers 504 within a POP 506 and funnel the requests into a manageable number of available inter-POP connections that can be persistently maintained. The role of the concentration server 502 is to reduce the complexity of the inter-POP connection mesh by reducing the number of inter-POP connections that need to be maintained in order to fully accelerate dynamic content between POPs. For example, hundreds of edge servers 502 could forward all of their requests to 8 to 10 concentration servers 502 within a POP 506, where the concentration servers 502 maintain connections to concentration servers in other POPs.

The number of concentration servers 502 required in a single POP 506 may depend on both the number of edge servers 504 in the POP 506, as well as the amount of content traffic routed through the POP 506. One advantage of using concentration servers 502 is that a single concentration server can handle a large number of edge servers. For example, the POP 506 may implement a 10 to 1 ratio between edge servers 504 and concentration servers 502. This allows the size of a POP 506 to grow as needed while limiting the number of new concentration servers 502 that may be needed to accommodate such growth.

In some embodiments, the concentration server 502 may be implemented using standard edge server hardware, but configured not to cache content in the same way as a traditional edge server, but rather to act as a proxy pass-through. This allows the concentration server 502 to handle a great deal more traffic than traditional edge servers 504 because large disk arrays are not needed. By eliminating the delay associated with disk I/O, and edge server with two 10 Gb/s ports can handle nearly 20 Gb/s of data instead of being limited by the capabilities of the disk array, which might only allow the server to handle 3 Gb/s. The concentration server function may be implemented as a software process running on the traditional edge server. Therefore, to implement concentration servers, no new type of hardware need be procured or designed. Instead, the same hardware that is used to implement the edge servers 504 can be used to implement the concentration servers 502.

As illustrated by FIG. 5, instead of having each edge server in each POP maintain connections to every other edge server in every other POP, the concentration servers 502 can aggregate requests within a single POP and then transmit those requests to the concentration servers of other POPs. This can reduce the hundreds of millions of connections that would otherwise be necessary to a manageable level that can be stored in the state tables of the concentration servers 502. For example, if 8 to 10 concentration servers are used on average in each POP, each concentration server may only need to maintain and establish a few hundred to a few thousand pre-warmed inter-POP connections.

Figure 6:
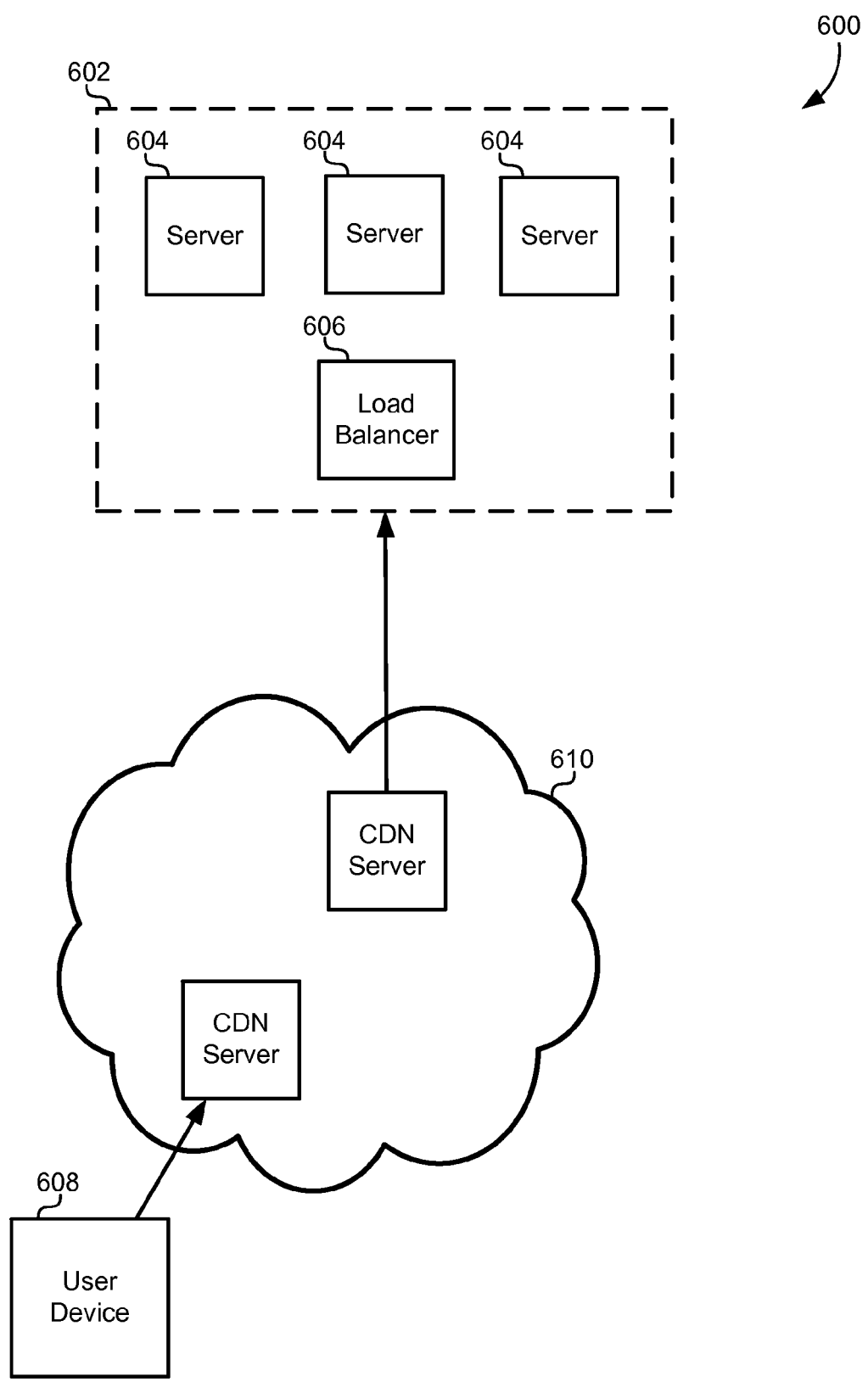
FIG. 6 illustrates a block diagram of connections between a customer origin environment and a nearby POP, according to some embodiments.

FIG. 6 illustrates a block diagram 600 of connections between a customer origin environment and a nearby POP, according to some embodiments. Generally, a customer origin environment 602 may use a plurality of servers 604 to service content requests. In order to most efficiently use the server resources, the customer origin environment 602 may use one or more load-balancing functions 606 to distribute customer requests as they are received. However, most customers write their applications such that a single user session is not allowed to hop between different backend servers and still maintain their state. Instead, some sort of affinity is usually required between a particular server 604 and the user device. Thus, during a single web session, each content request originating from a specific user device will be routed to the same server 604 in the customer origin environment 602. For example, user A would be mapped through a first server, while user B would be mapped through a second server. If user A were to suddenly switch to the second server, a state associated with their communication session could be lost. For example, user A could lose their shopping cart items, lose their progress in filling out sequential web forms, be logged out of their account, and/or the like.

Typically, customers can set up the origin environment 602 to track users by virtue of either (1) an incoming IP address, or (2) a value stored in a cookie on the user's browser. For customer origin servers not transmitting content through a CDN, it is much easier and less expensive to use the incoming IP address associated with the user device 608. However, when transmitting content through a CDN 610, the incoming IP address will usually be associated with an internal server address in a requesting POP of the CDN. CDNs have their own methods of balancing traffic between servers and POPs, and thus multiple requests from the same user may be routed through many different servers, each having their own unique IP address. Therefore, CDN-based content delivery often requires customers to use cookies in their load-balancing algorithms to identify the requesting user and assign them to the same backend server.

In short, IP-based affinity is cheaper and easier than cookie-based affinity, but IP-based affinity is generally incompatible with CDNs. Most customers begin serving their content without a CDN. When these customers expand to the point where they need a CDN to reliably deliver their content, they are often required to change their load-balancing algorithms and backend affinity schemes to use cookies instead of incoming IP addresses. This can lead to a significant expense and can deter customers from switching to CDNs for content delivery.

In some existing CDNs, the CDN itself may take responsibility for assigning users to the same server. However, many customers invest significant time and effort into developing sophisticated load-balancing algorithms that are wasted when this operation is handled by the CDN. As a result, the CDN can only use rudimentary load-balancing algorithms, such as round robin. Furthermore, in order for the CDN to handle load balancing, all of the origin servers in the cluster need to be "exposed" (accessible) to the CDN. This requires additional external IP addresses and introduces additional security risks.

Some embodiments described herein may allow customers to continue using an IP address based affinity for their applications while still utilizing a CDN. This may allow customers switching from a non-CDN environment to a CDN environment additional time to switch to a full cookie-based affinity scheme. For customers with a small number of backend servers, these embodiments may be used indefinitely, and need not require switching to a cookie-based affinity scheme at all.

Figure 7:
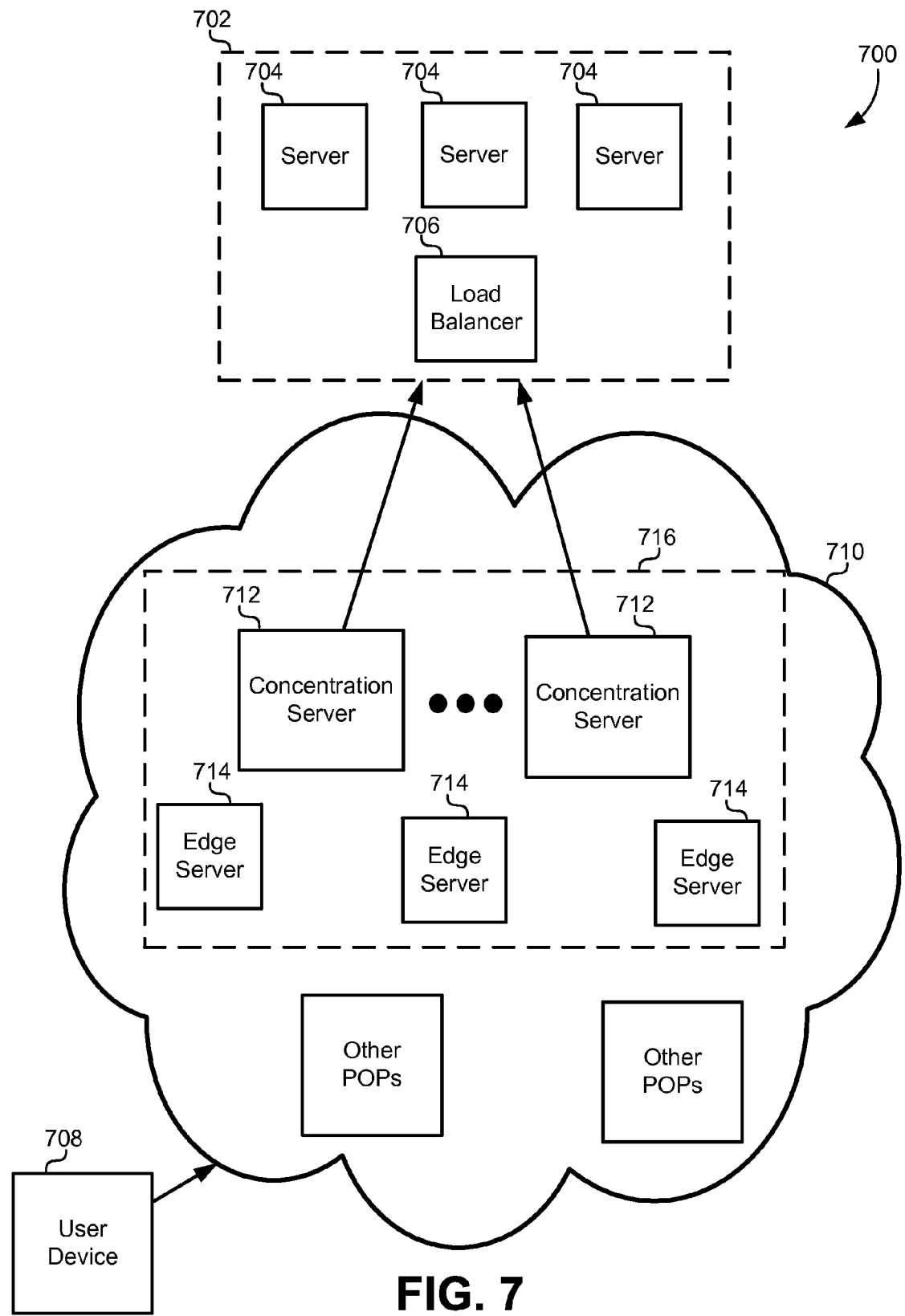
FIG. 7 illustrates a block diagram of connections between a customer origin environment and a local backend POP utilizing concentration servers to manage user affinity, according to some embodiments.

FIG. 7 illustrates a block diagram 700 of connections between a customer origin environment 702 and a local backend POP 716 utilizing concentration servers 712 to manage user affinity, according to some embodiments. The concentration servers 712 described above can be used to perform an IP-address-to-cookie mapping function that allows customers to continue using their sophisticated load-balancing algorithms without having immediately to shift to a cookie-based scheme. The concentration servers in the backend POP 716 can be configured to ensure that a particular user session always has its requests delivered to the customer origin environment 702 from the same server within the CDN 710. The CDN 710 can establish a cookie stored in the user browser to identify a user session. The cookie can then be used to determine which server within the CDN 710 the particular user has been assigned. By always delivering requests from a particular user through the same server, the customer origin environment 702 can continue using IP-based affinity schemes because the incoming IP address will remain consistent for each customer.

For example, 10 concentration servers 712 can be used to route all of the incoming user content requests. The rest of the servers 714 in the backend POP 716 can route all of their content requests through the concentration servers 712. In essence, the customer origin environment 702 will see all user requests coming from the same 10 IP addresses associated with the concentration servers 712. Alternatively, the concentration servers can route requests through the other servers 714 in the backend POP 716 such that users are always routed through the same servers with the same IP address.

By allowing concentration servers 712 to route incoming requests, new customers to the CDN 710 can have a degree of breathing room as they acclimate to the new distribution system. This can provide comfort to new customers—both pre-sale and post-sale—that they can safely switch to the new CDN 710 without requiring immediate changes to their affinity scheme.

In the embodiments discussed thus far, inter-POP connections can be been maintained between each POP within the CDN. In order to facilitate the large number of edge servers that will typically exist in a large-scale CDN, concentration servers can be been used to route requests between POPs. These concentration servers can also be used to funnel requests on the backend through a consistent set of IP addresses such that cookie-based affinity can be implemented on the frontend, while IP-address-based affinity can be maintained on the backend. In one implementation, a concentration server can have three operating modes: frontend, backend, and origin. The frontend mode can be used to gather user content requests and send them to backend POPs. The backend mode can be used to receive requests from frontend concentration servers. The origin mode can be used to collect requests in a backend POP and send them to servers within the origin environment. In some embodiments, each of the servers modes may run as a separate process on the same physical hardware.

An additional benefit may be provided by using concentration servers to interface with the customer origin environment. As described above, bottlenecks typically occur when a connection needs to be opened. Traditionally, each request to the customer origin environment would require opening a new connection comprised of the TCP handshakes, SSL handshakes, and TCP slow start protocol. Some embodiments described herein may also maintain persistent connections between the backend POP and the customer origin environment. In these embodiments, not only are connections between POPs consistently maintained, but the connections between the backend POP and the origin environment are also consistently maintained. Therefore, the only new connection that needs to be established during a user content request would be between the user device and the frontend POP. After this initial bottleneck is overcome, data can then travel at network speeds without delay between the user device and the customer origin environment.

Figure 8:
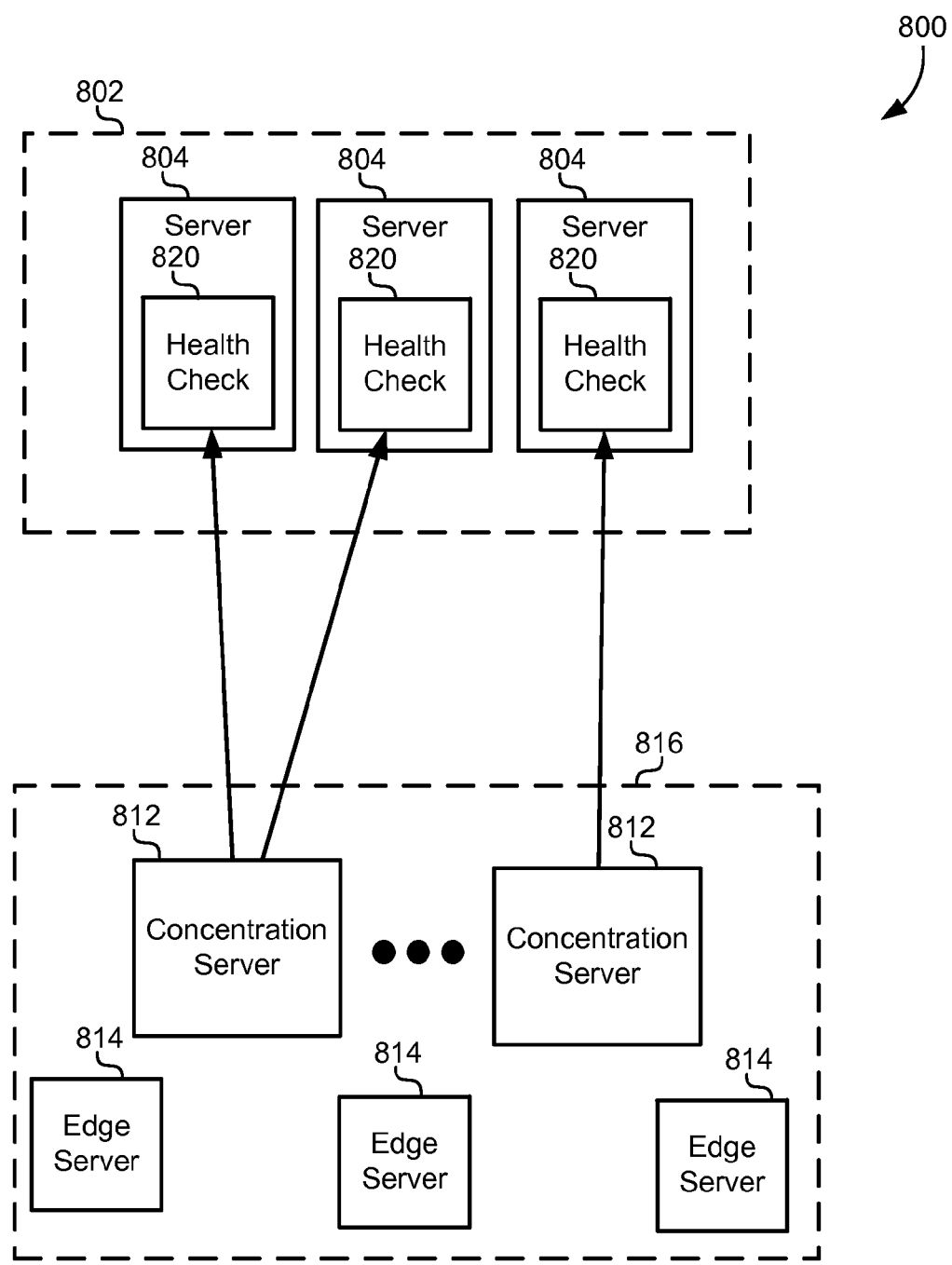
FIG. 8 illustrates a block diagram of a backend POP that maintains persistent connections with an origin environment, according to some embodiments.

FIG. 8 illustrates a block diagram 800 of a backend POP 816 that maintains persistent connections with an origin environment 802. Generally, connections between the customer origin environment 802 and the backend POP 816 will stay alive for a predetermined amount of time, commonly referred to as a "keep-alive" time. Connections between each POP server 814 for each user session cannot be maintained indefinitely without fatally congesting the customer origin environment 802. This would also require the customer to change network settings to accommodate the performance of the CDN.

Instead of requiring customers to maintain open connections at all times, some embodiments may instead use the concentration servers 812 to maintain persistent connections between the backend POP 816 and the customer origin environment 802. Most servers 804 at the origin include some persistent object that does not change over time. This may be referred to as a health check object 820. Each of the concentration servers 812 may maintain their open connections with the customer origin environment 802 by periodically accessing the health check object 820. The interval between each check of the health check object 820 can be determined heuristically to be less than keep-alive time specified by the customer origin environment 802. For example, if the keep-alive time is determined to be 10 min, then the concentration servers 812 can check the health check object 820 every 9 min. As a default, the concentration servers 812 can check the health check object 820 every 50 seconds because the minimum keep alive time is typically approximately 1 min. By periodically accessing the health check object 820, the concentration servers 812 can ensure that connections are persistently open between the backend POP 816 and the customer origin environment 802.

To a customer, this operation may look as though the backend POP 816 is simply checking the availability of servers 804 within the customer origin environment 802. Therefore, the customer does not need to make any changes in their system in order for the CDN to maintain these connections. This allows the same techniques described above for maintaining connections between the backend POP 816 and the frontend POP to be used between the backend POP 816 and the customer origin environment 802. For example, connections can be maintained until they become stale and/or unreliable, at which point they can be released and new connections can be established. These new connections can be maintained by virtue checking the health check object 820 periodically or servicing actual user content requests.

The number of connections maintained by the concentration servers 812 in a backend POP 816 to the customer origin environment 802 can be determined based on what the customer origin environment 802 can handle. In some embodiments, the number of connections maintained by the concentration servers 812 is configured to be significantly less than the total number of request connections normally handled by the customer origin environment 802. Thus, the minimum and maximum numbers of connections maintained by the concentration servers 812 can be a customer specific number that is based on the amount traffic that is handled by the servers 804 in the customer origin environment 802.

In some embodiments, multiple customer origin environments may share a single backend POP. Therefore, the concentration servers 812 may be shared among multiple customer origin environments. Each of the concentration servers 812 may maintain connections to several different customer origin environments according to each individual customer's minimum and maximum number of connections.

In some embodiments, the number of concentration servers operating in a backend POP mode or a frontend POP mode may be a fraction of the number of edge servers per POP. For example, some embodiments may use a 10 to 1 ratio. Other embodiments may use and 8 to 1 ratio, and/or the like. The minimum number of concentration servers may be determined as the minimum number required to keep the CDN functional. In other words, a minimum number of concentration servers per POP may be configured such that inter-POP connections do not become a bottleneck. Similarly, the number of connections maintained by each concentration server may also be subject to a minimum and maximum. In some embodiments, each frontend concentration server may maintain a minimum of, for example, eight connections to each backend concentration server. The number of connections established between each concentration server may be set dynamically based on traffic loads. For example, during light traffic loads a concentration server may maintain eight connections to each concentration server in other POPs, while during heavy traffic loads, the concentration server may maintain 15 or more connections to each concentration server in the other POPs.

When the backend POPs receive requests, they can then be forwarded to the origin through one of the backend concentration servers. However, in order to maintain the cookie-to-IP-address mapping described above, the particular backend concentration server for each request should be determined deterministically such that they are consistent. In one embodiment, the cache array routing protocol (CARP) can be used to channel requests through the same origin concentration server. Generally in CARP, different hashes can be generated for each URL to distribute requests to multiple servers. By using CARP, instead of round robin, modulo, or other distribution algorithms, one of the concentrators and/or servers could go off-line without affecting the distribution of requests to the remaining servers. Specific to these embodiments, the last server before the origin concentrators can use CARP on the value stored in the cookie to ensure all origin communication for a particular user always flows through the same server.

Figure 9:
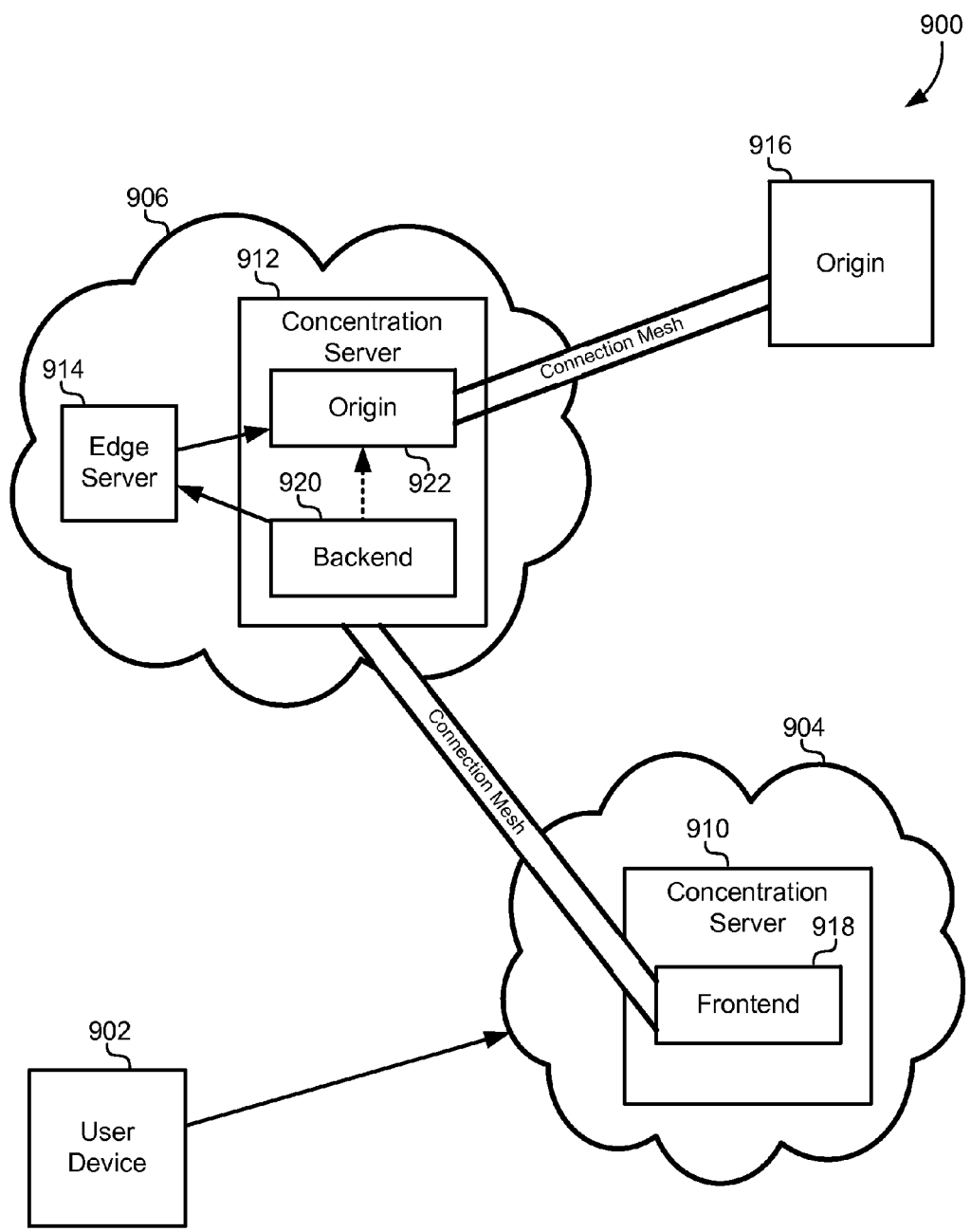
FIG. 9 illustrates a block diagram of a content request as it propagates between a user device and an origin using dynamic acceleration techniques, according to some embodiments.

FIG. 9 illustrates a block diagram 900 of a content request as it propagates between a user device 902 and an origin 916 using the acceleration techniques described herein. The user device 902 can send a request to the frontend POP 904. Depending on the configuration of the CDN, the frontend POP 904 can route the request to concentration server 910. In some configurations, the request may first pass through a load balancer, through switching fabric, through an edge server, and/or any other components or functions within the frontend POP 904. Concentration server 910 may have a frontend process 918 operating thereon that receives the request and forward it to another concentration server in a backend POP 906.

The backend POP 906 may include one or more additional concentration servers, such as concentration server 912. Concentration server 912 can receive the request from the frontend POP 904 through a persistently maintained, bottleneck-free connection as described above. Concentration server 912 may include a backend process 920 operating thereon that receives the request and forwards it to one or more edge servers 914 in the backend POP 906. The edge server 914 can then forward the request for content to an origin process 922 operating on the concentration server 912. In other embodiments, the backend process 920 can forward the request directly to the origin process 922. Note that in some embodiments, the backend process 920 and the origin process 922 can operate on the same physical concentration server 912. In other cases, the backend process 920 and the origin process 922 can operate on different servers. The origin process 922 may be configured to periodically check a health check object 924 at the origin to maintain one or more persistent connections to the origin 916 as described above. The origin server 922 may use one of these existing connections to forward the request to the origin 916.

An additional feature that may be implemented on some of the origin concentration servers is the ability to enforce rate of flow or other control policies dictated by the origin customer. Traditionally, customers were responsible for receiving any amount of incoming traffic from the CDN. The origin concentration servers may allow the CDN to receive requests from the customer and accordingly control the flow of data between the origin and the backend POP. For example, customers could ask that origin traffic be limited to 30 Mbps. More specific requirements from the customer could also be accommodated. A customer could ask, for example, for a maximum of 30 Mbps, with a maximum of 100 concurrent HTTP connections, a maximum of 300 requests per second, and a maximum of 10 concurrent SSL connections. Each of these connection characteristics could be monitored and/or enforced by the origin concentration servers, which can easily communicate and coordinate with each other because they are in the same POP. In contrast, a traditional CDN architecture would require tens of thousands of edge servers around the world coordinating to ensure these same limits, which would not be feasible.

In some embodiments, the customer can interface with the CDN to take advantage of the concentration server environment. The fact that concentration servers are used to deliver requests through a limited number of IP addresses may allow the customer origin to strictly enforce IP address lockdown. The CDN can provide the customer origin with the IP addresses of each origin concentration server in the backend POP that are connected to the customer origin environment. The customer can then configure their firewalls to allow only those IP addresses identified by the CDN. In cases where the backend POP or concentration servers within the backend POP fail, the CDN can IP alias concentration servers in nearby POPs with the IP addresses provided to the customer origin environment. These other POPs could take over during the downtime of the backend POP without compromising the security of the customer origin environment.

Figure 10:
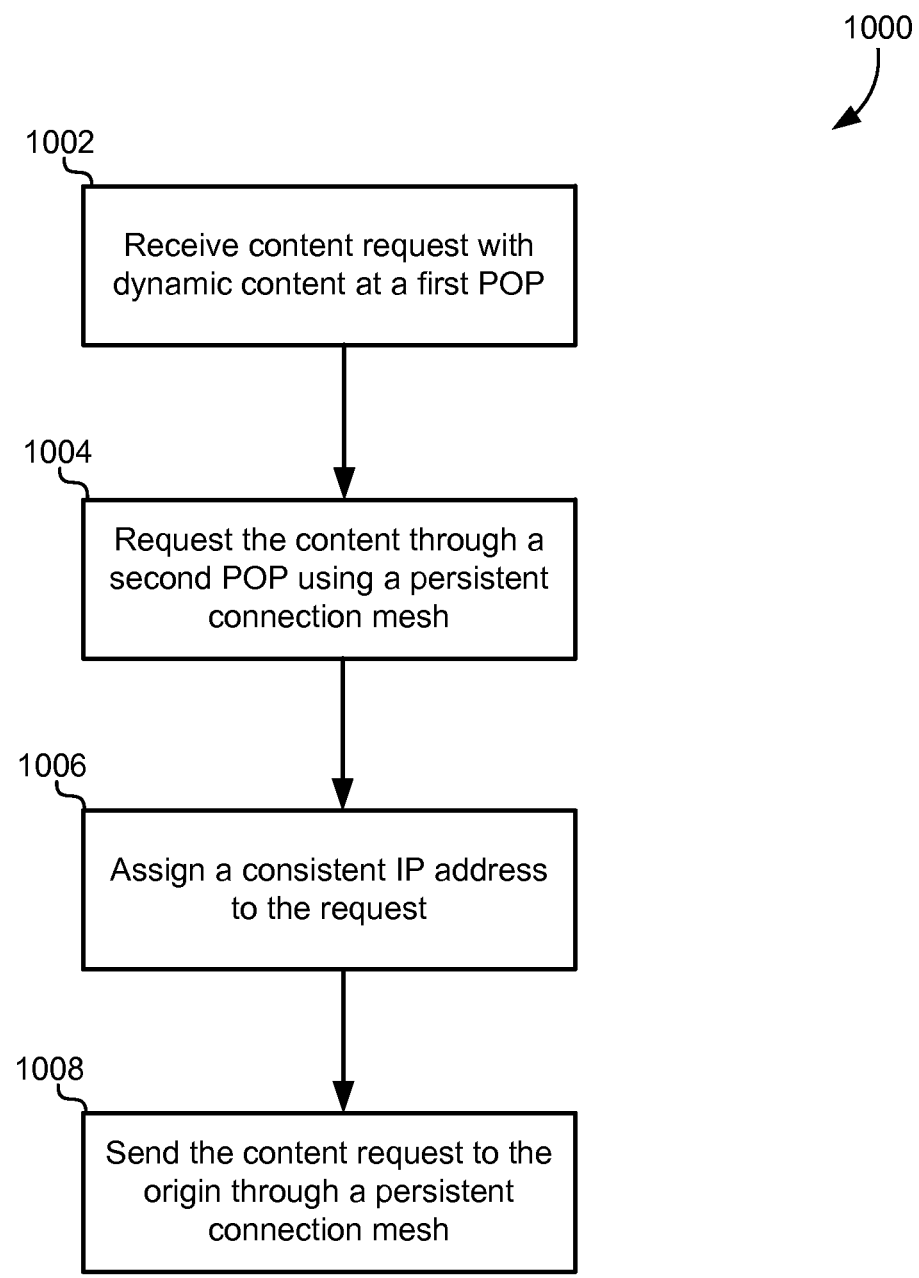
FIG. 10 illustrates a flowchart of a method for accelerating dynamic content in a delivery network, according to some embodiments.

FIG. 10 illustrates a flowchart 1000 of a method for accelerating dynamic content in a delivery network, according to some embodiments. The method may include receiving a content request at first POP (1002). The first POP may be part of a CDN, and may be configured to receive content requests from a user device. The first POP may be one of a number of geographically distributed POPs within the CDN. The first POP may include a plurality of edge servers that store and distribute content in response to user requests. Content responsive to the content request may include a first content portion and/or a second content portion. In some cases, the first content portion may include dynamic content that is not stored in the first POP, but rather must be obtained through another POP or from a customer origin environment. In some cases, the second content portion may include static content that is available and/or stored in the first POP.

The method may also include requesting the content through a second POP using a persistent connection mesh (1004). The content request may include dynamic content stored at an origin or any static content that is not available in the first POP. The persistent connection mesh may be maintained between the first POP and the second POP in a persistent manner. For example, the persistent connection mesh may be established around the time when the servers in the first POP and/or the second POP are initialized. The persistent connection mesh may be configured to frontload connection bottlenecks, such as TCP handshakes, SSL handshakes, and TCP slow start throttling of the congestion window. The persistent connection mesh may also be configured to be maintained in the absence of any content request. In other words, the persistent connection mesh need not be established on-demand, but is rather maintain both before and after the content request. This may allow the persistent connection mesh to be pre-warmed in order to speed up transmissions and increase the congestion window. The persistent connection mesh may include multiple connections to the second POP and to other POPs. In one embodiment, the persistent connection mesh may include a single inter-POP connection. The persistent connection mesh may be maintained by a plurality of concentration servers in each POP as described elsewhere herein. The concentration servers may periodically refresh individual connections within the persistent connection mesh as they become stale and/or unreliable.

The method may additionally include assigning a consistent IP address to the request (1006). The consistent IP address may be used for all requests in a single user session. The IP address may correspond to one of a plurality of concentration servers in the second POP. The concentration servers in the second POP may gather all incoming requests and operate in an origin mode to forward these requests to the proper origin server. In some embodiments, the customer origin environment can be configured to only accept requests from IP addresses associated with the concentration servers in the second POP. In some embodiments, the concentration servers in the second POP may be further configured to constrain or customize content traffic that is delivered to the customer origin environment according to policies or specifications provided by the customer.

The method may further include sending the content request to the origin through a second persistent connection mesh (1008). Just as a first persistent connection mesh was established between the first POP and the second POP, a second persistent connection mesh may be established between concentration servers in the second POP and the customer origin environment. The connections in the second persistent connection mesh may be maintained by accessing keep-alive objects stored on the origin servers in the customer origin environment. Similar to the first persistent connection mesh, the second persistent connection mesh may be configured to frontload traditional communication bottlenecks, such as TCP handshakes, SSL handshakes, and TCP slow start throttling.

It will be understood that each of the method steps of flowchart 1000 are optional, and the no specific steps are required by any embodiment discussed herein. Furthermore, one having skill in the art would be able to rearrange, combine, and/or separate each of the steps of flowchart 1000 as needed. For example, each step may be divided into a series of sub-steps. Therefore, flowchart 1000 is exemplary and not meant to be limiting.

Exemplary Hardware

Figure 11:
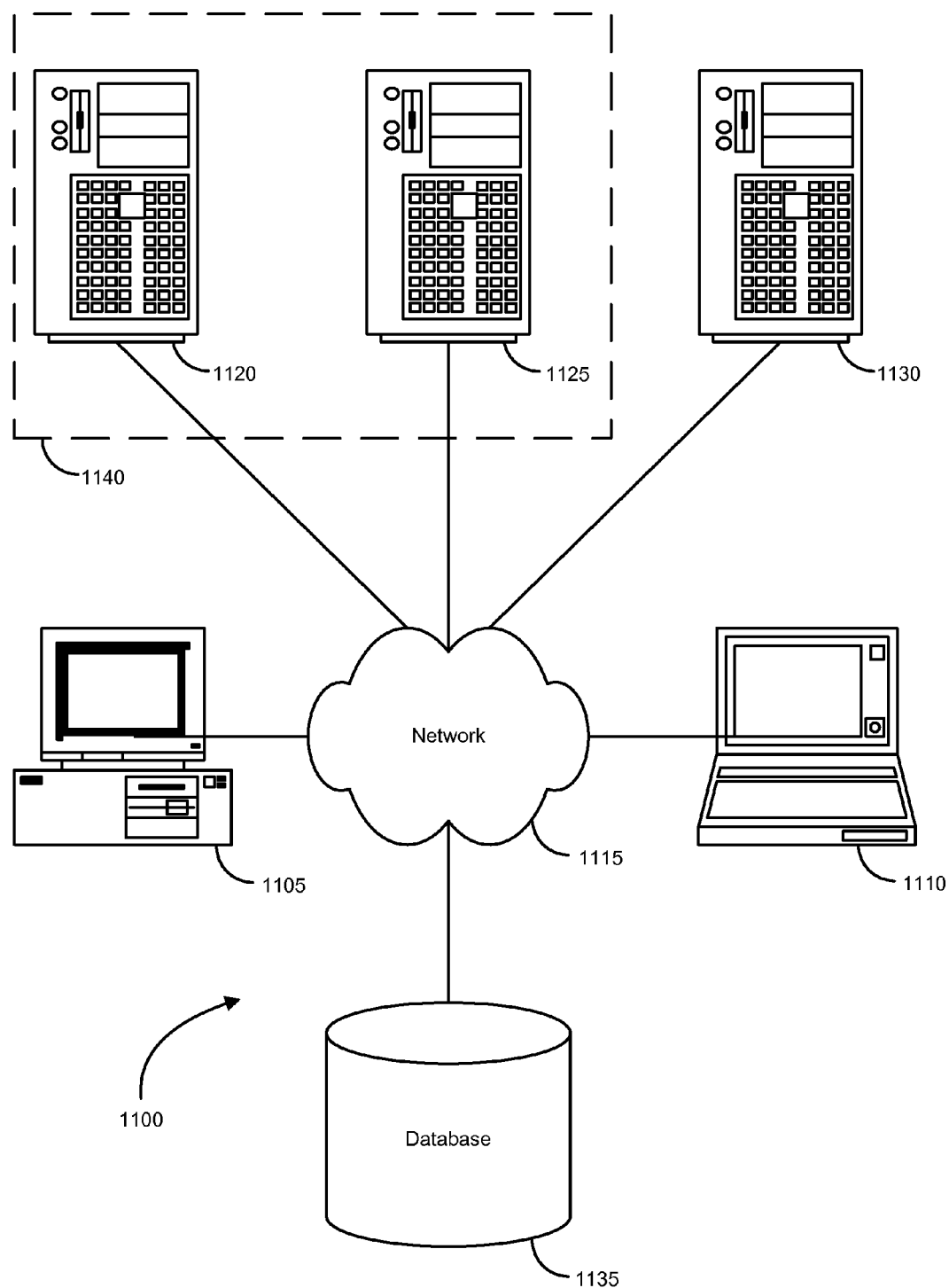
FIG. 11 illustrates an exemplary environment in which some embodiments may be implemented.

The concentration servers, the edge servers, and the CDN network may be implemented on computer hardware components. For example, each of the embodiments disclosed herein may be implemented in various parts of a networked general-purpose computer system. FIG. 11 is a block diagram illustrating components of an exemplary operating environment in which various embodiments of the present invention may be implemented. The system 1100 can include one or more user computers 1105, 1110, which may be used to operate a client, whether a dedicated application, web browser, etc. The user computers 1105, 1110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 1105, 1110 may also have any of a variety of applications, including one or more development systems, database client and/or server applications, and web browser applications. Alternatively, the user computers 1105, 1110 may be any other electronic device, such as a thin-client computer, Internet-enabled mobile telephone, and/or personal digital assistant, capable of communicating via a network (e.g., the network 1115 described below) and/or displaying and navigating web pages or other types of electronic documents. Although the exemplary system 1100 is shown with two user computers, any number of user computers may be supported.

In some embodiments, the system 1100 may also include a network 1115. The network may can be any type of network familiar to those skilled in the art that can support data communications using any of a variety of commercially-available protocols, including without limitation TCP/IP, SNA, IPX, AppleTalk, and the like. Merely by way of example, the network 1115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 1120, 1125, 1130 which can be general purpose computers and/or specialized server computers (including, merely by way of example, PC servers, UNIX servers, mid-range servers, mainframe computers rack-mounted servers, etc.). One or more of the servers (e.g., 1130) may be dedicated to running applications, such as a business application, a web server, application server, etc. Such servers may be used to process requests from user computers 1105, 1110. The applications can also include any number of applications for controlling access to resources of the servers 1120, 1125, 1130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1105, 1110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1105, 1110.

In some embodiments, an application server may create web pages dynamically for displaying on an end-user (client) system. The web pages created by the web application server may be forwarded to a user computer 1105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 1100 may also include one or more databases 1135. The database(s) 1135 may reside in a variety of locations. By way of example, a database 1135 may reside on a storage medium local to (and/or resident in) one or more of the computers 1105, 1110, 1115, 1125, 1130. Alternatively, it may be remote from any or all of the computers 1105, 1110, 1115, 1125, 1130, and/or in communication (e.g., via the network 1120) with one or more of these. In a particular set of embodiments, the database 1135 may reside in a storage-area network ("SAN") familiar to those skilled in the art. Similarly, any necessary files for performing the functions attributed to the computers 1105, 1110, 1115, 1125, 1130 may be stored locally on the respective computer and/or remotely, as appropriate. In one set of embodiments, the database 1135 may be a relational database, such as Oracle 10g, that is adapted to store, update, and retrieve data in response to SQL-formatted commands.

Figure 12:
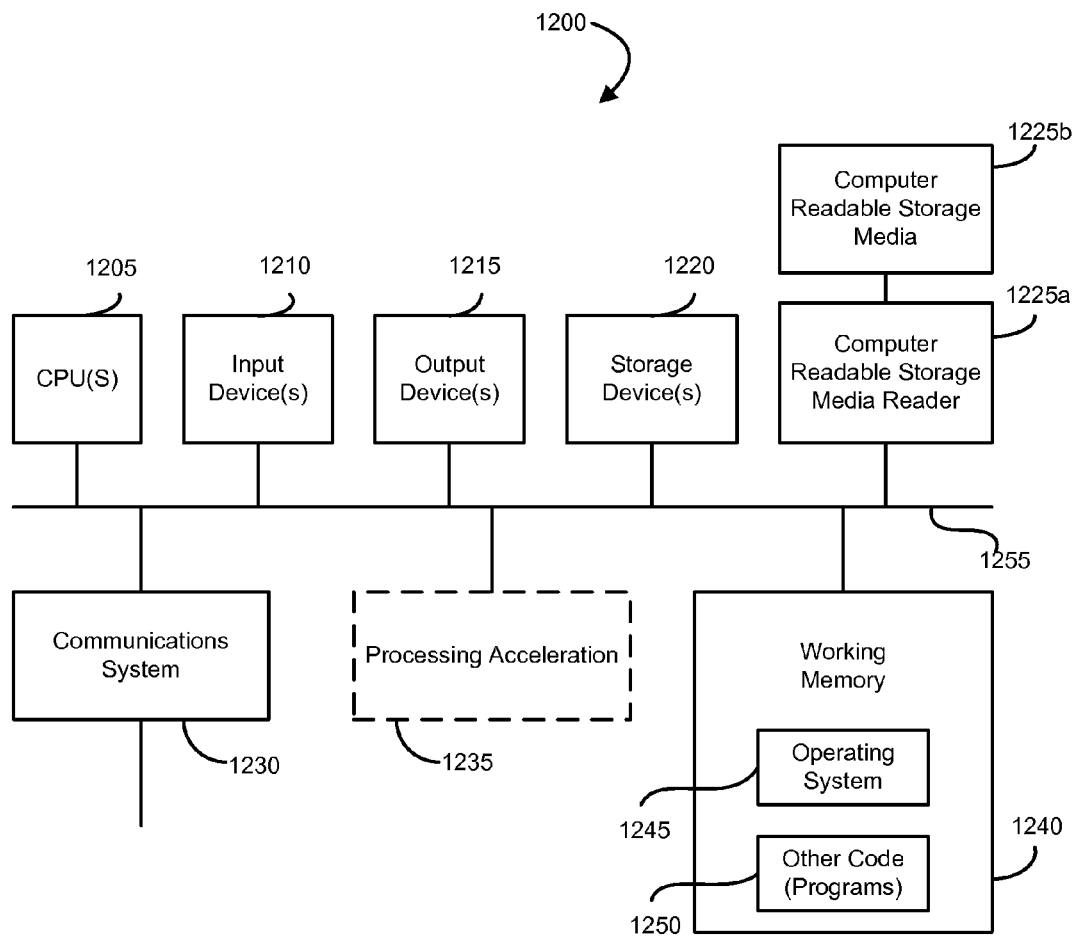
FIG. 12 illustrates one example of a computer system, according to some embodiments.

FIG. 12 illustrates an exemplary computer system 1200, in which various embodiments of the present invention may be implemented. The system 1200 may be used to implement any of the computer systems described above. The computer system 1200 is shown comprising hardware elements that may be electrically coupled via a bus 1255. The hardware elements may include one or more central processing units (CPUs) 1205, one or more input devices 1210 (e.g., a mouse, a keyboard, etc.), and one or more output devices 1215 (e.g., a display device, a printer, etc.). The computer system 1200 may also include one or more storage device 1220. By way of example, storage device(s) 1220 may be disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1225a, a communications system 1230 (e.g., a modem, a network card (wireless or wired), an infra-red communication device, etc.), and working memory 1240, which may include RAM and ROM devices as described above. In some embodiments, the computer system 1200 may also include a processing acceleration unit 1235, which can include a DSP, a special-purpose processor and/or the like.

The computer-readable storage media reader 1225a can further be connected to a computer-readable storage medium 1225b, together (and, optionally, in combination with storage device(s) 1220) comprehensively representing remote, local, fixed, and/or removable storage devices plus storage media for temporarily and/or more permanently containing computer-readable information. The communications system 1230 may permit data to be exchanged with the network 1220 and/or any other computer described above with respect to the system 1200.

The computer system 1200 may also comprise software elements, shown as being currently located within a working memory 1240, including an operating system 1245 and/or other code 1250, such as an application program (which may be a client application, web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed. Software of computer system 1200 may include code 1250 for implementing embodiments of the present invention as described herein.

Each of the methods described herein may be implemented by a computer system, such as computer system 1200 in FIG. 12. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A CDN for balancing content requests to the origin while delivering content, comprising:
   a plurality of edge servers communicating with a plurality of end users, wherein:
   the plurality of edge servers includes a first edge server,
   the plurality of end users includes a first end user,
   the first end user receives a first cookie for a first unique identifier,
   wherein the first edge server receives a first request for content from the first end user,
   the plurality of edge servers includes a second edge server,
   the plurality of end users includes a second end user, and
   the second end user receives a second cookie for a second unique identifier, wherein the second edge server receives a second request for content from the second end user; and
   a plurality of customer origin environment servers communicating with a plurality of origin addresses, wherein:
   the plurality of customer origin environment servers includes a first customer origin environment server, which is assigned the first end user based on the first unique identifier,
   the plurality of customer origin environment servers includes a second customer origin environment server, which is assigned to the second end user based on the second identifier,
   the first customer origin environment server receives the first request for content from the first end user;
   the first customer origin environment server sends the first request for content to the plurality of origin addresses when requesting content for the CDN,
   the second customer origin environment sever receives the second request for content from the second end user; and
   the second customer origin environment server sends the second request for content to the plurality of origin addresses when requesting content for the CDN.

2. The CDN for balancing content request to the origin while delivering content as recited in claim 1, wherein a subset of the plurality of customer origin environment servers is assigned to one of the plurality of origin addresses.

3. The CDN for balancing content request to the origin while delivering content as recited in claim 1, wherein:
   the first customer origin environment server persistently communicates with one of the plurality of origin addresses, and
   the second customer origin environment server persistently communicates with the one of the plurality of origin addresses.

4. The CDN for balancing content request to the origin while delivering content as recited in claim 1, wherein:
   one of the plurality of origin addresses is serviced by a plurality of origin servers,
   the number of plurality of customer origin environment servers is more than the number of the plurality of origin servers.

5. The CDN for balancing content request to the origin while delivering content as recited in claim 1, wherein:
   the first end user is associated with a first IP address,
   the second end user is associated with a second IP address,
   the first unique identifier maps to the first IP address, and
   the second unique identifier maps to the second IP address.

6. The CDN for balancing content request to the origin while delivering content as recited in claim 1, wherein:
   the first customer origin environment server is associated with a first IP address,
   the second customer origin environment server is associated with a second IP address,
   the first unique identifier maps to the first IP address, and
   the second unique identifier maps to the second IP address.

7. The CDN for balancing content requests to the origin while delivering content as recited in claim 1, wherein:
   the CDN sends the first unique identifier to the first end user, and
   the CDN sends the second unique identifier to the second end user.

8. A method for balancing content request to the origin while delivering content from a CDN, the method comprising:
   communicating between a plurality of edge servers and a plurality of end users, wherein:
   the plurality of edge servers includes a first edge server, and
   the plurality of end users includes a first end user;

sending a first cookie to the first end user with a first unique identifier;
receiving a request for content at the first edge server from the first end user, wherein:
the plurality of edge servers includes a second edge server, and
the plurality of end users includes a second end user;
sending a second cookie to a second end user for a second unique identifier;
receiving a request for content at the second edge server from the second end user;
communicating from a plurality of customer origin environment servers to a plurality of origin addresses, wherein the plurality of customer origin environment servers includes a first customer origin environment server;
assigning the first customer origin environment server to the first end user based on the first unique identifier, wherein the plurality of customer origin environment servers includes a second customer origin environment server;
assigning the second customer origin environment server to the second end user based on the second identifier;
requesting the first content from the plurality of origin addresses by the first customer origin environment server; and
requesting the second content from the plurality of origin addresses by the second customer origin environment server.

9. The method for balancing content request to the origin while delivering content from the CDN, as recited in claim 8, further comprising assigning a subset of the plurality of customer origin environment servers to one of the plurality of origin addresses.

10. The method for balancing content request to the origin while delivering content from the CDN, as recited in claim 8, further comprising:
maintaining persistent communication between the first miss server and one of the plurality of origin addresses; and
maintaining persistent communication between the second miss server and one of the plurality of origin addresses.

11. The method for balancing content request to the origin while delivering content from the CDN, as recited in claim 8, further comprising servicing one of the plurality of origin addresses with a plurality of origin servers, wherein the number of plurality of miss servers is more than the number of the plurality of origin servers.

12. The method for balancing content request to the origin while delivering content from the CDN, as recited in claim 8, further comprising:
associating the first miss server with a first IP address;
associating the second miss server with a second IP address;
mapping the first unique identifier to the first IP address; and
mapping the second unique identifier to the second IP address.

13. The method for balancing content request to the origin while delivering content from the CDN, as recited in claim 8, further comprising:
associating the first end user with a first IP address;
associating the second end user with a second IP address;
mapping the first unique identifier to the first IP address; and
mapping the second unique identifier to the second IP address.

14. The method for balancing content request to the origin while delivering content from the CDN, as recited in claim 8, further comprising:
sending the first unique identifier from the CDN to the first end user; and
sending the second unique identifier from the CDN to the second end user.

15. A server system for balancing content request to the origin while delivering content from a CDN, the server system comprising:
a plurality of edge servers communicating with a plurality of end users, wherein each of the plurality of edge servers is programmed with instructions for:
communicating between a plurality of edge servers and a plurality of end users, wherein the plurality of edge servers includes a first edge server and the plurality of end users includes a first end user,
sending a first cookie to the first end user with a first unique identifier,
receiving a request for the first content at the first edge server from the first end user; wherein the plurality of edge servers includes a second edge server and the plurality of end users includes a second end user, and
sending a second cookie to a second end user for a second unique identifier;
receiving a request for the second content at the second edge server from the second end user;
a plurality of customer origin environment servers in communication with a plurality of origin addresses, wherein the plurality of customer origin environment servers is programmed with instructions for:
communicating between the plurality of customer origin environment servers and the plurality of origin addresses,
assigning a first customer origin environment server from the plurality of customer origin environment servers to the first end user based on the first unique identifier,
assigning a second customer origin environment server from the plurality of customer origin environment servers to the second end user based on the second identifier,
requesting the first content from the plurality of origin addresses by the first customer origin environment server, and
requesting the second content from the plurality of origin addresses by the second customer origin environment server.

16. The server system for balancing content request to the origin while delivering content from the CDN as recited in claim 15, further programmed with instructions for assigning a subset of the plurality of customer origin environment servers to one of the plurality of origin addresses.

17. The server system for balancing content request to the origin while delivering content from the CDN as recited in claim 15, further programmed with instructions for:
maintaining persistent communication between the first customer origin environment server and one of the plurality of origin addresses; and
maintaining persistent communication between the second customer origin environment server and one of the plurality of origin addresses.

18. The server system for balancing content request to the origin while delivering content from the CDN as recited in claim 15, further programmed with instructions for servicing one of the plurality of origin addresses with a plurality of origin servers, wherein the number of plurality of customer origin environment servers is more than the number of the plurality of origin servers.

19. The server system for balancing content requests to the origin while delivering content from the CDN as recited in claim 15, further programmed with instructions for:
  associating the first customer origin environment server with a first IP address;
  associating the second customer origin environment server with a second IP address;
  mapping the first unique identifier to the first IP address; and
  mapping the second unique identifier to the second IP address.

20. The server system for balancing content request to the origin while delivering content from the CDN as recited in claim 15, further programmed with instructions for:
  associating the first end user with a first IP address;
  associating the second end user with a second IP address;
  mapping the first unique identifier to the first IP address; and
  mapping the second unique identifier to the second IP address.

* * * * *